United States Patent [19]

Sato et al.

[11] Patent Number: 5,087,999
[45] Date of Patent: Feb. 11, 1992

[54] CAPACITOR BANK PROVIDED WITH A PROTECTIVE DEVICE

[75] Inventors: Yasuhiro Sato; Yoichi Hirano, both of Tsukuba; Sataro Yamaguchi, Tokyo, all of Japan

[73] Assignees: Director General, Agency of Industrial Science and Technology; Mitsubishi Denki Kabushiki Kaisha, both of Tokyo, Japan

[21] Appl. No.: 573,697

[22] Filed: Aug. 28, 1990

[30] Foreign Application Priority Data

Sep. 21, 1989 [JP] Japan .................. 1-245491
Sep. 21, 1989 [JP] Japan .................. 1-245492

[51] Int. Cl.⁵ .......................... H01G 1/11
[52] U.S. Cl. .................................. 361/17
[58] Field of Search .......... 361/15, 17, 20, 272, 361/275, 79

[56] References Cited

U.S. PATENT DOCUMENTS

| | | | |
|---|---|---|---|
| 2,428,576 | 10/1947 | Marbury | 172/237 |
| 4,367,412 | 1/1983 | Cheever | 361/257 |
| 4,638,238 | 1/1987 | Gyugyi et al. | 361/79 |
| 4,975,796 | 12/1990 | MacDougall | 361/16 |

FOREIGN PATENT DOCUMENTS 48-42288 12/1973 Japan .
57-88825 6/1982 Japan .

*Primary Examiner*—Donald A. Griffin
*Attorney, Agent, or Firm*—Leydig, Voit & Mayer

[57] ABSTRACT

A capacitor bank comprising a plurality of capacitor units coupled in parallel, and an energy absorbing resistor Rj is inserted in series with each one Cj of the capacitor units. Thus, when a capacitor unit Cj suffers an insulation failure, the energy flowing into the failing capacitor unit Cj from the other capacitor units is absorbed substantially by the resistor Rj. The capacitor bank may comprise several serially connected rows of parallel connected capacitor units, an energy absorbing capacitor Rij being inserted in series with each one Cij of the capacitor units. Further, each capacitor unit Cj may be provided with a protective short-circuiting device Sj, which short circuits the two terminals of the capacitor unit Cj via a bypass line 9 upon an occurance of failure of the capacitor unit Cj. An oscillation preventing resistor Ry is connected in series with each capacitor unit Cj in addition to an energy absorbing resistor Rx.

9 Claims, 5 Drawing Sheets 5,087,999

CAPACITOR BANK PROVIDED WITH A PROTECTIVE DEVICE

BACKGROUND OF THE INVENTION

This invention relates to a capacitor bank comprising a plurality of capacitor units for storing energy and for producing a large impulse current, and more particularly to such a capacitor bank provided with a protective device or means for preventing the propagation of the failure of the capacitor units resulting from the destruction of electrical insulation, etc., thereof.

The capacitor banks, which comprise a plurality of capacitor units for storing energy and generate a large current upon closure of a circuit-closure switch, are simple in structure and are capable of producing a large current instantaneously at a predetermined moment of time. Thus, they are widely used, for example, as a power source for supplying pulse or impulse currents for experimental magnetic confinement type plasma devices, etc.

The capacitor banks generally consists of a plurality of capacitor units coupled in parallel to provide for the required capacitance value. If an electrical insulation failure takes place in the capacitor element or the terminals, etc., of one of the capacitor units during the charging operation thereof, for example, the failing capacitor unit is almost short-circuited. As a result, the energy stored in other capacitor units coupled in parallel therewith flows into the failing capacitor unit, which may explode due to the accumulated heat, etc. In the case where the amount of energy stored in the capacitor bank is small, the propagation of the failure may be prevented to some degree by the impedance of the circuit provided by the transmission cables, etc., interposed between the respecctive capacitor units, which impedance suppresses the short-circuit current. In recent years, however, large-sized capacitor banks capable of storing a large amount of energy are becoming increasingly common; when an insulation failure occurs in such large capacitor banks, the impedance of the transmission lines, etc., may prove to be insufficient for suppressing the level of the short-circuit current, and a large amount of energy may flow instantaneouly into the failing capacitor unit, with the result that the failing capacitor unit is eventually exloded or that the transmission lines are destroyed by an overcurrent exceeding the allowable level of the current that can flow therethrough.

Thus, various protective devices are proposed for preventing excess energy from flowing into the capacitor unit under failure. FIG. 1 shows a capacitor bank provided with a conventional protective device disclosed in Japanese Patent No. 738536. The capacitor bank of FIG. 1 comprises a plurality of capacitor units C1 through Cn coupled in parallel for supplying a large pulse current to a load L via a circuit-closure switch SW. The protective short-circuiting devices S1 through Sn, provided for the respective capacitor units C1 through Cn, operate as follows: When one, say Cj, of the capacitor units C1 through Cn undergoes an electrical insulation failure, a large current flows into the failing capacitor Cj, via the associated protective short-circuiting device Sj, from the other capacitor units coupled in parallel with the failing unit Cj. By means of the electromagnetic force generated by this large current, the electrical insulation within the protective short-circuiting device Sj is destroyed so as to short-circuit the two terminals of the failing capacitor unit Cj via a bypass line 9, thereby preventing the current from flowing into the failing capacitor unit Cj. The explosion and fire of the failing capacitor unit Cj is thus avoided.

FIG. 2 shows an example of the structure of the protective short-circuiting devices S1 through Sn, which structure is disclosed, for example, in Japanese Patent Application Laid-Open (Kokai) No. 57-88825. A pair of lead or terminal plates 1 and 3 and a fuse element 2 electrically coupling them are sandwitched between a pair of electrically insulating sheets 4, to be held together between upper and lower holder plates 5 secured together by means of bolts 8. When the associated capacitor unit Cj fails, a large current flows thereinto via the fuse element 2; thus, the fuse element 2 is melted and exploded due to the heat and the electromagnetic force generated by the current, thereby destroying the insulating sheets 4. As a result, the two terminals of the capacitor unit Cj are short-circuited via the lead plate 1, the lower holder plate 6, and the bypassing line 9, and the energy stored in the other capacitor units is prevented from flowing into the failing capacitor unit Cj. Incidentally, the pressure of the explosion is released via the vent hole 7 formed in the upper holder plate 5. The protective short-circuiting device thus provides for the safety. This type of safety system is better than the system which use as a fuse attached to each capacitor. The role of a fuse is to cut the current but a large current is hard to interrupt; on the other hand, the protective short-circuiting device of FIG. 2 is capable of short-circuiting a large current and is easy to produce and low in cost.

However, the above described protective devices for the capacitor bank has the following disadvantage. Namely, since no means is provided for absorbing the energy stored in the capacitor units, the stored energy produces a large short-circuit current, which keeps on flowing until the energy is dissipated by the resistance which the discharging circuit itself includes. Further, due to the short-circuit current, a large transient voltage, which is not generated under the normal operating conditions, may be developed in the circuit-closure switch transmission system or the load, which are coupled across the capacitor bank. This may aggravate the failure. In addition, a large excess current flows through the failing capacitor unit until the protective short-circuiting device functions; thus, deterioration of the unit, such as the carbonization of the capacitor element or of the insulation oil thereof, cannot be avoided. Furthermore, a long delay in the operation of the protective short-circuiting unit may result in further aggravation of the failure, such as the explosion of the capacitor bank.

SUMMARY OF THE INVENTION

It is therefore a primary object of this invention to provide a capacitor bank in which the energy stored in the capacitor bank can be absorbed and dissipated safely upon an occurance of an insulation failure of the capacitor units, and in which the level of the short-circuit current resulting from the failure is suppressed within a safe range.

The above object is accomplished in accordance with the principle of this invention by a capacitor bank which comprises a plurality of capacitor units coupled in parallel circuit relationship; and energy absorbing resistors each coupled in series with one of said capacitor units such that each one of the capacitor units is coupled in series with at least one of the energy absorbing resistors, whereby when any one of the capacitor units undergoes an electrical insulation failure, electrical energy flowing into the failing capacitor unit from other wholesome capacitor units is substantially absorbed and dissipated by the energy absorbing resistors. It is preferred that the capacitor bank comprises a plurality of rows or groups of capacitor units coupled in parallel circuit relationship, an energy absorbing resistor being coupled in series with each one of the capacitor units, wherein the rows of capacitor units are coupled in series to form the whole capacitor bank.

According to a preferred aspect of this invention, the capacitor bank comprises, in addition to the parallel connected capacitor units and energy absorbing resistors, short-circuiting means for short-circuiting via a bypass line the two terminals of any capacitor unit upon an electrical insulation failure of the capacitor unit; and oscillation preventing resistors each coupled in series with a capacitor unit so as to form a serial circuit together with a bypass line of the short-circuiting means upon an insulation failure of the capacitor unit, thereby preventing an oscillation of a short-circuit current flowing in said serial circuit. In a preferred form of this aspect, the short-circuiting means comprises at least one bypass line via which a pair of parallel connected capacitor units are short-circuited upon failure of one of the pair of the capacitor units, an energy absorbing resistor being coupled in series with the pair of parallel connected capacitor units.

By means of the simple insertion of resistors coupled in series with the capacitor units according to this invention, the short-circuit current level upon an occurance of an insulation failure is suppressed within the safety range; further, the energy discharged from the capacitor units at an insulation failure is absorbed quickly by the resistors so that secondary explosions of the bank, etc., resulting from the discharged energy can be effectively prevented.

BRIEF DESCRIPTION OF THE DRAWINGS

The novel features which are believed to be characteristic of this invention are set forth with particularity in the appended claimes. This invention itself, however, both as to its organization and method of operation, together with further objects and advantages thereof, may be best understood from the following detailed description of the preferred embodiments, taken in connection with the accompanying drawings, in which:

FIG. 3($b$) is an equivalent circuit of FIG. 3($a$), which respresents the equivalent circuit at an occurance of an insulation failure of one of the capacitor units;

In the drawings, like reference characters and numerals represent like or corresponding parts or portions.

DETAILED DESCRIPTION OF THE PREFERRED EMBODIMENTS

Figure 1:
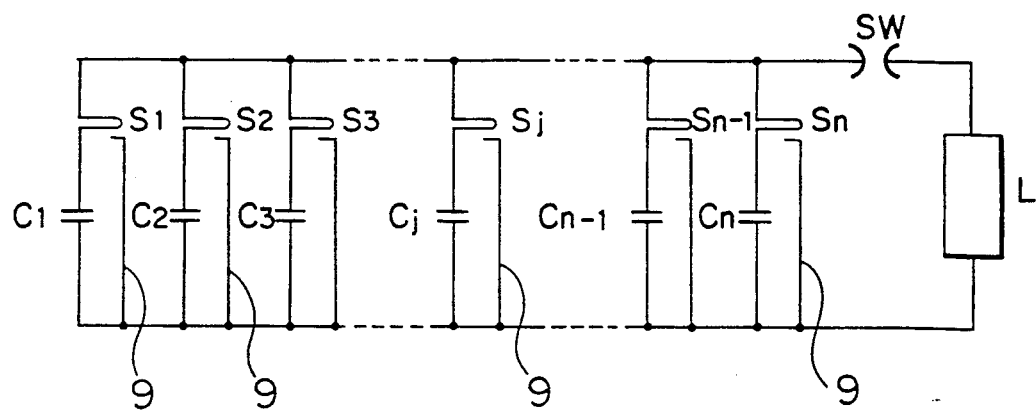
FIG. 1 is a circuit diagram of a capacitor bank provided with a conventional protective means.

Referring now to the drawings, the embodiments of this invention are described.

Figure 3A:
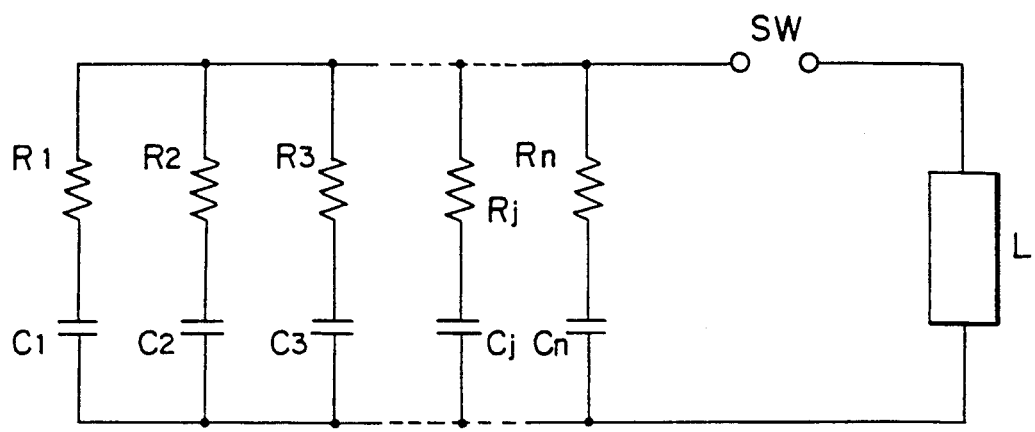
FIG. 3($a$) is a circuit diagram of a capacitor bank provided with protective means according to this invention.
Figure 3B:
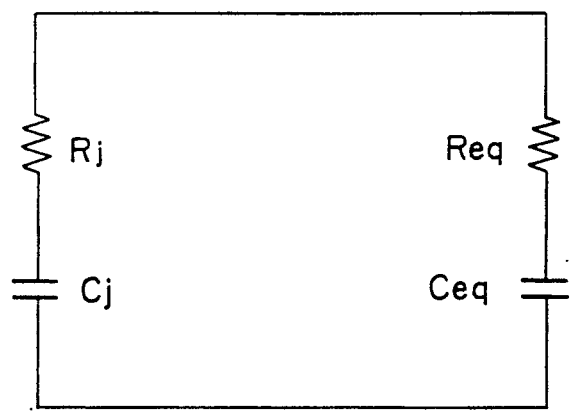

Referring first to FIGS. 3($a$) and 3($b$), let us describe a capacitor bank according to a first embodiment of this invention. The capacitor bank of FIG. 3($a$) comprises: a plurality of capacitor units C1 through Cn having the same capacitance C and coupled in parallel circuit relationship; and the resistors R1 through Rn having the same resistance value R and coupled in series with respective capacitor units C1 through Cn. The capacitor bank is coupled across the load L via the circuit-closure switch SW, to supply a large pulse current to the load L upon closure of the switch SW.

When a failure takes place in the capacitor bank, the resistors R1 through Rn supress and limit the short-circuit current and absorb and dissipate the stored energy; the operation of the resistors R1 through Rn when failure occurs is as follows.

Let us suppose that the j'th capacitor unit Cj has failed with the result that the terminals thereof are virtually short-circuited. The resulting equivalent circuit is as represented in FIG. 3($b$), where Req represents the equivalent resistance of the resistors other than the resistor Rj, and Ceq the equivalent capacitance of the wholesome capacitor units other than the j'th unit Cj. Then, the equivalent resistance Req and the equivalent capacitance Ceq are expressed as follows:

$$Req = R/(n-1),$$

and $$Ceq = (n-1) \cdot C,$$

where n is the number of the capacitor units C1 through Cn, and R and C are the resistance of the resistors R1 through Rn and the capacitance of the capacitors C1 through Cn, respectively; further, the overall resistance of the serial connection of the equivalent resistance Req and the resistor Rj is equal to:

$$Req + R = \{n/(n-1)\} \cdot R.$$

Thus, if the inner resistance Rc of each one of the capacitors C1 through Cn is taken into consideration, the short-circuit current I is expressed as follows:

$$I = V/(R+Rc) \times (n-1)/n, \tag{1}$$

where V represents the voltage to which the capacitor units are charged. Further, the energy W stored in the capacitor units other than the failing unit Cj is represented by the equation:

$$W = (n-1) \cdot C \cdot V^2/2, \tag{2}$$

so that the energy absorbed by the resistor Rj is expressed by the equation:

$$W_j = C \cdot V^2/2 \times R/(R+R_c) \times (n-1)^2/n, \quad (3)$$

where C, R, Rc, V, and n are as above.

Figure 2:
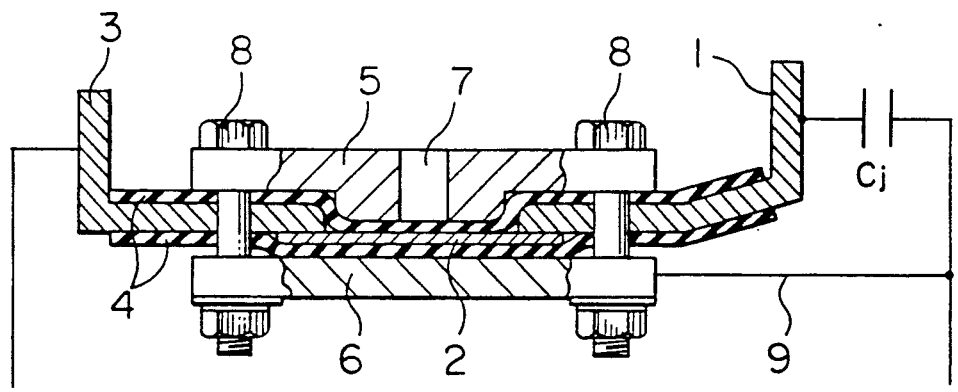
FIG. 2 is a sectional view of a protective short-circuiting device which may be utilized in the capacitor bank of FIG. 1.

It is clear from equation (1) above that, in the case where the number n of the capacitor units is sufficiently large, the short-circuit current I is substantially limited by the value of the resistance R of the energy-absorbing resistors Rl through Rn. Further, it is clear from equations (2) and (3) above that substantially the whole energy stored in the capacitor bank is absorbed by the resistor Rj, thereby minimizing the energy absorbed by the failing capacitor unit Cj. Thus, the need for the provision of the protective short-circuiting devices as shown in FIGS. 1 and 2 may be dispensed with. Further, the short-circuit current can be quickly attenuated without generating oscillatory currents, such that the adverse effects on the other parts consitituting the capacitor bank, etc., are minimized.

As described above, the resistors R1 through Rn effectively limit the level of the short-circuit current and absorb the energy stored in the capacitor bank when an insulation failure occurs in one of the capacitor units C1 through Cn. One may expect that the insertion of the resistors R1 through Rn substantially reduces the normal current level of the capacitor bank during the normal discharging operation thereof, thereby reducing the energy efficiency of the capacitor bank. Contrary to such expectation, however, the equivalent resistance of the resistors R1 through Rn is equal to R/n during the normal operation of the capacitor bank, which resistance can be reduced to a level substantially equal to or less than the resistance of the discharging circuit (i.e., the resistance value of the load coil and the transmission lines, etc.) by increasing the number n of the capacitor units.

Figure 4:
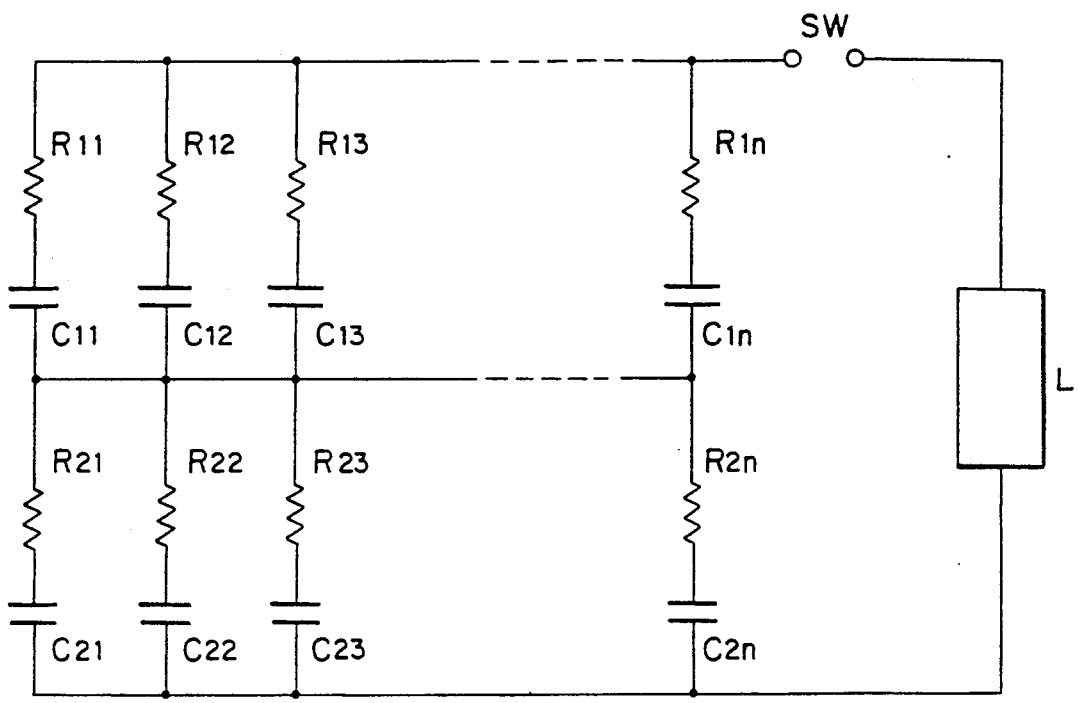
FIGS. 4 and 5 are circuit diagrams showing further embodiments according to this invention.

Referring next to FIG. 4 of the drawings, let us describe a second embodiment of this invention. The same bank parameters (such as the voltage) as those furnished by the capacitor bank of FIG. 3(a) can be furnished by the capacitor bank of FIG. 4 which comprises capacitor units rated at a charging voltage of V/2. An even number 2 n of capacitors are divided into two rows or groups—a first group C11 through C1n and a second group C21 through C2n—, wherein the capacitor units within each one of the two groups are connected in parallel circuit relationship; further, the first and the second group of capacitor units are coupled in series, a resistor, R11 through R1n and R21 through R2n, being inserted in series circuit relationship with each one of the capacitor units C11 through C1n and C21 through C2n, respectively.

When one of the capacitor units of the bank of FIG. 4 fails, only the capacitor units of the group coupled in parallel with the failing capacitor unit are affected, wherein the operation of the group of capacitor units containing the failing unit at the time of such failure is the same as the operation of the bank of FIG. 3(a) described above. Thus, if we assume that the j'th capacitor unit C1j in the first group of parallel connected capacitor units C11 through C1n undergoes an insulation failure, the energy W1j which is absorbed and dissipated by the resistor R1j coupled in series with the failing capacitor unit C1j is expressed by the equation (3) above, where the capacitance C and the charging voltage V are two times and one half of the corresponding values thereof, respectively, of the capacitor bank of FIG. 3(a); hence, the energy W1j absorbed by the resistor R1j is reduced to one half of the energy Wj which is absorbed by the resistor Rj in the case of the capacitor bank of FIG. 3(a). Thus, the ratings of the resistors can be substantially reduced. Further, since the voltage across each one of the capacitor units is reduced to one half of the value of the capacitor bank of FIG. 3(a), the transient voltage developed across the resistors at the insulation failure is also reduced, which facilitates the reduction of the ratings of the resistors. Since semiconductor devices such as thyristors and diodes are often utilized as switching elements in recent years, the fact that the abnormal voltage at the failure can be suppressed provides a further advantage of the circuit arrangement of FIG. 4. Incidentally, it is to be noted that two groups or rows each comprising parallel connected capacitor units are coupled in series in the case of FIG. 4. The circuit arrangement wherein serially connected capacitor unit pairs are connected in parallel is dangerous and hence not preferred, since, when one of the capacitor units fails in such a circuit arrangement, a voltage twice as great as the rating voltage is developed across the capacitor unit which is coupled in series with the failing capacitor unit.

Figure 5:
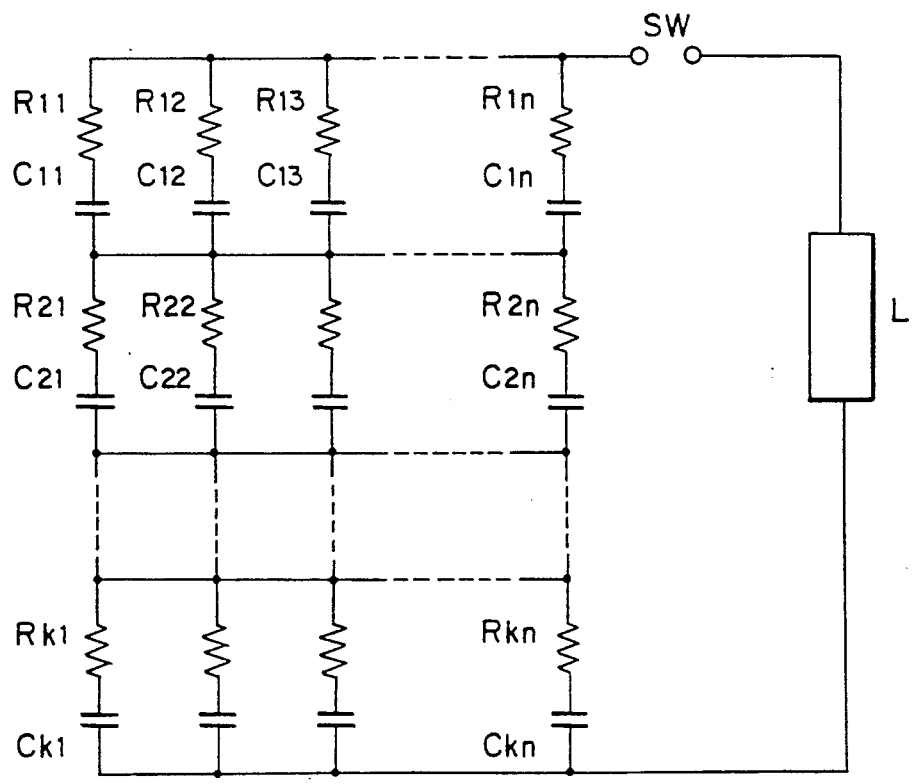

FIG. 5 shows a third embodiment in which, extending the concept of the second embodiment, k groups or rows of parallel connected n capacitor units-the first row comprising the units C11 through C1n, the second row comprising C21 through C2n, and the k'th row comprising Ck1 through Ckn—are connected in series, an energy absorbing resistor, Rij, being inserted in series with each one, Cij, of the capacitor units. Thus, the first row of the capacitor bank comprises the capacitor units C11 through C1n connected in parallel, and the resistors R11 through R1n connected in series with the capacitor units C11 through C1n, respectively; the second row, the capacitor units C21 through C2n connetected in parallel, and the resistors R21 through R2n connected in series with the capacitor units C21 through C2n, respectively; and the k'th row, the capacitor units Ck1 through Ckn connected in parallel and the resistors Rk1 through Rkn connected in series with the capacitor units Ck1 through Ckn, respectively. Provided that the charging voltage of the capacitor bank as a whole is the same as that of the first embodiment, the charging voltage of each one of the capacitor units of this embodiment can be reduced to 1/k (one k'th) of that of the first embodiment. Thus, the advantages of the second embodiment are further augmented: when one of the capacitor units—Cji—is subjected to an insulation failure, only the row containing the failing capacitor unit Cji —the j'th row comprising the capacitor units Cj1 through Cjn—is affected by the failure, so that the stored energy which flows into the resistor Rji connected in series with the failing capacitor unit Cji is reduced to 1/k (one k'th) of the corresponding value in the case of the first embodiment. Incidentally, it is to be noted that where the specifications (with regard to the capacity or the inner resistance) of the parallel connected capacitor units differ from each other, it is preferred to select the specifications (with regard to the resistance and the absorbable energy, etc.) of the energy absorbing resistors at variable levels in accordance with the respective sepcifications of the capacitor units so as to enhance the reliability.

Figure 6:
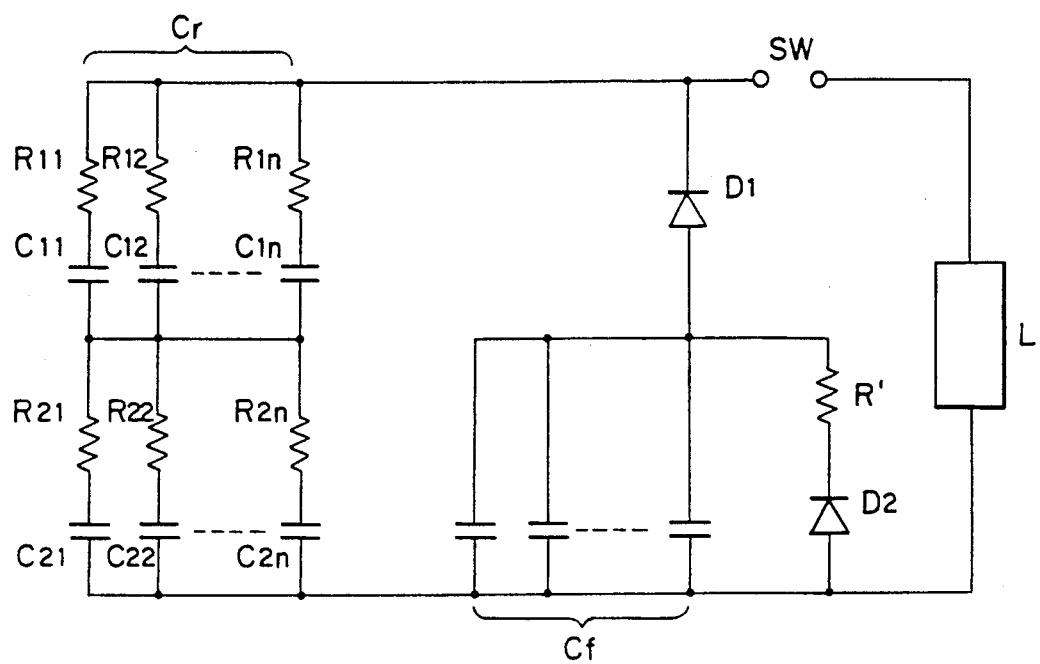
FIG. 6 is a circuit diagram showing an example of the specific organization of the capacitor bank according to this invention.

FIG. 6 shows a specific circuit organization of the capacitor bank according to this invention, in which the bank Cr (the current build-up bank) comprises two rows of 48 parallel connected capacitor units each at the rating of 10 kV and 6.5 kJ, so as to attain the overall bank rating of 20 kV and 624 kJ, while the bank Cf (the current maintenance bank) comprises a single row of parallel connected 108 capacitor units each at the rating of 3.3 kV and 37 kJ to attain the overall bank rating of 3.3 kV and 400 kJ. The direction of current through the bank Cf is controlled by a diode D1 coupled in series therewith; further, a serially connected resistor R' and diode D2 is connected is parallel with the capacitor units of the bank Cf in such a polarity that the reverse charge in the capacitor units may be discharged therethrough. The serial connection of the load L and the switch SW is connected across the two banks Cr and Cf, such that when the switch SW is closed, an impulse current is supplied from the banks Cr and Cf to the load L.

The bank Cr of FIG. 6 comprises, according to the principle of this invention, energy aborbing resistors Rij each connected in series with a capacitor unit Cij of the bank. Rating of the resistors Rij may be selected according to the specific needs; let us discuss the case where each one of the resistors Rij consists of an alumina ceramic disk resistor rated at 0.6 ohms. In such case, the short-circuit current is equal to about 15.8 kA, and the energy which should be absorbed and dissipated by a resistor is about 300 kJ; the attenuation or reduction of the output current during normal operation of the bank due to the insertion of the resistors Rij is as small as about 4.5%. From expreimental results it has been found out that the absorbable energy and the withstanding voltage of an alumina disk resistor utilized as an energy aborbing resistor of a capacitor bank are equal to or greater than about 1 kJ/cc and about 3 kV/cm, respectively. Thus, as can be easily verified from the discussion above (in particular equation (3) above) with respect to the energy absorption by the resistors within the capacitor bank, a serial connection of two commercially available alumina disk resistors each 95 mm across and 25 mm thick may be utilized as a resistor Rij.

It is to be noted with respect to the circuit organization of FIG. 6 that the conventional protective means is insufficient. Namely, protective short-circuiting devices according to the principle of Japanese Patent Application Laid-Open No. 57-88825 discussed above have conventionally been utilized for the protection of the capacitor bank together with a coaxial cable of 5 m which connects the capacitor units to the circuit closure switch SW as a decoupling means between the capacitor units; however, when a capacitor unit in the bank Cr suffers an insulation failure, a short-circuit current of about 400 kA flows through the transmission line in spite of these measures, which current level is far beyond the current level rating thereof.

Figure 7:
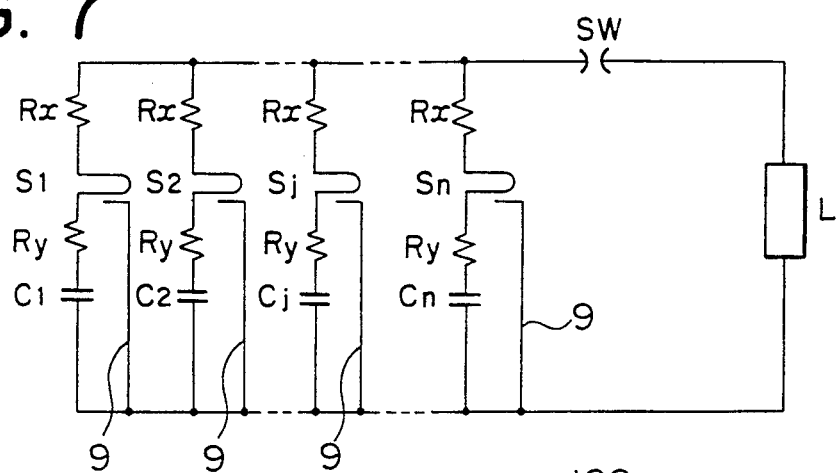
FIG. 7 is a circuit diagram of a capacitor bank according to a modified aspect of this invention.

Referring next to FIG. 7 of the drawings, let us describe an embodiment according to another aspect of this invention. The capacitor bank of FIG. 7 comprises—in addition to the parallel connected capacitor units C1 through Cn and energy absorbing resistors Rx each connected in series with one of the capacitor units C1 through Cn—protective short-circuiting devices S1 through Sn and oscillation preventing resistors Ry. Each one of the protective short-circuiting devices, Sj, which may have a structure as described above by reference to FIG. 2, short-circuits the two terminals of capacitor unit Cj associated therewith via a bypass line 9 when the capacitor unit Cj undergoes an insulation failure. On the other hand, an oscillation preventing resistor Ry is inserted in series with each one of the capacitor units C1 through Cn in such a manner that when the capacitor unit Cj fails and is short-circuited by means of the protective short-circuiting device Sj associated therewith, the resistor Ry and the capacitor unit Cj form a serial circuit together with the bypass line 9 of the protective short-circuiting device Sj, the resistor Ry thereby preventing the oscillation of the short-circuit current in said serial circuit. As in the above cases, the serial connection of the switch SW and the load L is connected across the bank so that an impulse current is supplied from the bank to the load L upon closure of the switch SW.

The function of the energy absorbing resistors Rx of FIG. 7 are the same as the function of those R1 through Rn of the first embodiment shown in FIG. 3(a). Namely, when a capacitor unit—say the j'th capacitor unit Cj—fails, the protective device Sj is triggered to short-circuit the two terminals of the capacitor unit Cj via a bypass line 9, so that the current from the other wholesome capacitor units flow through the energy absorbing resistor Rx connected in series with the failing capacitor unit Cj; thus, each one of the resistors Rx should be capable of absorbing substantially the whole of the energy:

$$W = (n-1) \times C \cdot V^2 / 2$$

stored in the wholesome capacitors, wherein V represents the charging voltage of the capacitor units C1 through Cn. The maximum level of the short-circuit current Imax is limited under V/Rx:

$$Imax \leq V/Rx,$$

since substantially the same argument as those set forth above with respect to equation (1) also applies to the present case.

On the other hand, the oscillation preventing resistors Ry of FIG. 7 are inserted in series with respective capacitor units C1 through Cn for the purpose of preventing the oscillation of the short-circuit current. Let us assume as before that the j'th capacitor unit Cj fails to trigger the protective short-circuiting device Sj associated therewith. A serial circuit consisting of the failing capacitor unit Cj and the oscillation preventing resistor Ry is short-circuited via the bypass line 9 of the protective short-circuiting device Sj. Thus, the oscillation of the short-circuit current in said serial circuit can be prevented and the surge voltage is not generated across the energy absorbing resistor Rx, if the resistance Ry of the resistor Ry is selected at a value which satisfies the inequality:

$$Ry \geq 2 \cdot \sqrt{(L/C)},$$

wherein L represents the stray inductance of the circuit consisting of the protective short-circuiting device Sj and the capacitor unit Cj, and C represents the capacitance of the capacitor unit Cj.

Figure 8:
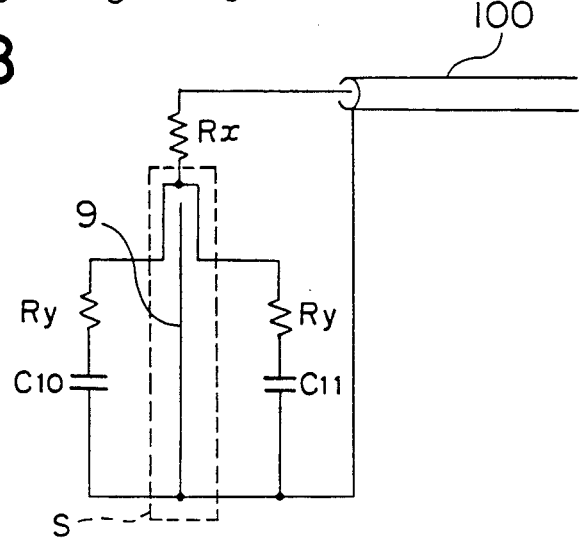
FIG. 8 is a circuit diagram of a portion of a capacitor bank according to the principle similar to that of FIG. 7.

FIG. 8 shows a circuit configuration utilizing a protective short-circuiting device of another type, wherein two capacitor units C10 and C11 connected in parallel circuit relationship are coupled to a single protective short-circuiting device S. In series with each one of the capacitor units C10 and C11 is coupled an oscillation preventing resistors Ry, such that when one of the capacitor units C10 and C11 fails, both the serial connection of C10 and Ry (at the left) and the serial connection of C11 and Ry (at the right) are short-circuited via the bypass line 9 of the protective short-circuiting device S. An energy absorbing resistor Rx is coupled in series with the above circuit comprising the parallel connected capacitor units C10 and C11 and the oscillation preventing resistors Ry connected in series therewith. A plurality of circuit units having the same configuration as that shown in FIG. 8 are connected in parallel to form a capacitor bank, which is coupled across a load (not shown) via a switch (not shown) through a coaxial cable 100.

The operation of the circuit configuration of FIG. 8 is essentially the same as that of the circuit of FIG. 7, except that both the capacitor units C10 and C11 are short-circuited via the common bypass line 9 of the protective short-circuiting device S when one of the capacitor units C10 and C11 fails. Thus, when one of the paired capacitor units C10 and C11 is subjected to an insulation failure, a large current flows, primarily from the other capacitor unit of the pair, into the failing unit via the oscillation preventing resistors Ry and the protective short-circuiting device S, thereby triggering the protective device S to short-circuit both the paired capacitor units C10 and C11 via the bypass line 9. The short-circuit currents are prevented from oscillation by the serial insertion of the oscillation preventing resistors Ry, and no surge voltage is developed across the energy absorbing resistor Rx. Further, since the two terminals of the capacitor units C10 and C11 are short-circuited via the bypass line 9 of the protective short-circuiting device S, the energy stored in the other wholesome capacitor units (not shown) coupled in parallel with the capacitor units C10 and C11 shown in FIG. 8 is discharged via the energy absorbing resistor Rx, which thus absorbs and dissipates the stored energy while minimizing the maximum level of the short-circuit current flowing therethrough.

Figure 9A:
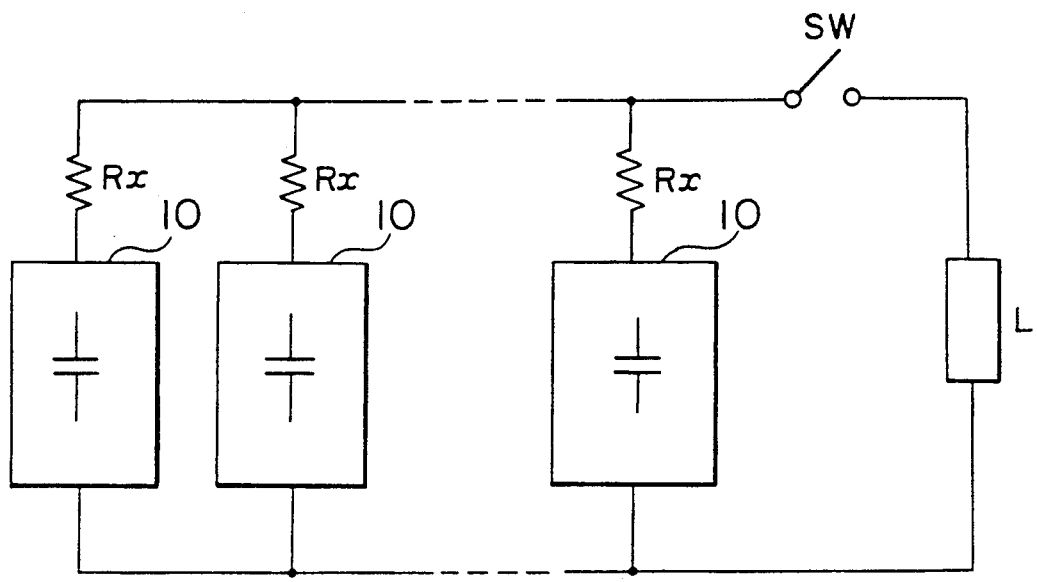
FIGS. 9($a$) and 9($b$) are circuit diagrams showing the organization of another capacitor bank according to the principle similar to that of FIG. 7.
Figure 9B:
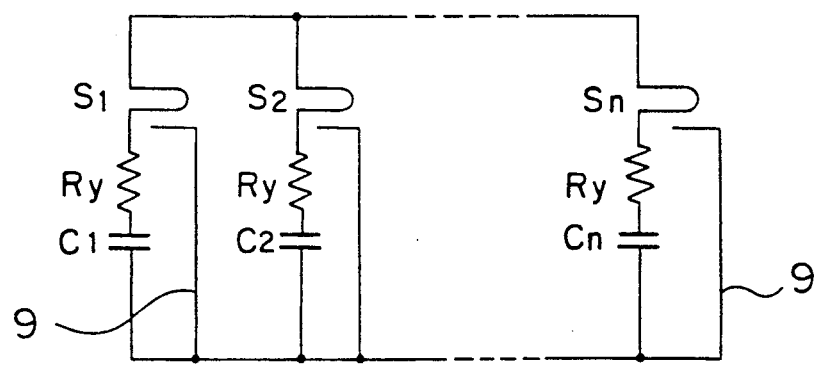

FIG. 9(a) shows another embodiment in which a plurality of capacitor bank units 10 having the circuit organization as shown in FIG. 9(b), for example, are coupled in parallel to form the whole bank, which is coupled across the load L via a switch SW. The circuit organization of the unit banks as shown in FIG. 9(b) is the same as that shown in FIG. 7 except that the number n of the capacitor units C1 through Cn may be smaller. An energy absorbing resistor Rx is coupled in series with each one of the bank units 10.

The advantage of the circuit organization of FIG. 9(a) is as follows. Since the safety of each separate bank unit, which is of moderate size, can be provided by the provision of the protective short circuit devices Sj and the resistors Ry, it suffices, for the safety of the whole bank, to provide for each one of the bank units 10 a single energy absorbing resistor Rx. Since the resistors Rx must be capable of absorbing a large amount of energy, they are large-sized and expensive. The number of large and expensive resistors Rx can be reduced by the circuit organization of FIG. 9(a).

What is claimed is:

1. A capacitor bank adapted to be coupled across a load via a circuit-closure switch for supplying a large current instantaneously to the load upon closure of the circuit-closure switch, the capacitor bank comprising:
   a plurality of capacitor units coupled in parallel; and
   energy absorbing resistors each coupled in series with one of said capacitor units such that each one of the capacitor units is coupled in series with at least one of the energy absorbing resistors, whereby when any one of the capacitor units undergoes an electrical insulation failure, electrical energy flowing into the failing capacitor unit from other capacitor units is substantially absorbed and dissipated by the energy absorbing resistors.

2. A capacitor bank as claimed in claim 1, comprising a plurality of rows of capacitor units coupled in parallel, an energy absorbing resistor being coupled in series with each one of the capacitor units, wherein the rows of capacitor units are coupled in series to form the capacitor bank.

3. A capacitor bank as claimed in claim 1, wherein each of said capacitor units have essentially the same capacitance; and
   each of said energy absorbing resistors have essentially the same resistance.

4. A capacitor bank as claimed in claim 1, wherein the equivalent resistance of said energy absorbing resistors is equal to the value of the resistor divided by the number of capacitor units coupled in series; and
   the resistor's wattage rating is essentially equal to the following equation:

$$W = \frac{C \cdot V^2}{2} \cdot \frac{R}{R + R_c} \cdot \frac{(n-1)^2}{n}$$

Where
W = The necessary wattage rating of the resistor;
C = The value of the capacitors;
$R_c$ = The value of the internal resistance of said capacitors;
V = The voltage to which the capacitor units are charged;
n = The number of capacitor units.

5. A capacitor bank for coupling across a load via a circuit-closure switch for supplying a large current instantaneously to the load upon closure of the circuit-closure switch, the capacitor bank comprising:
   a plurality of capacitor units coupled in parallel;
   short-circuiting means for short-circuiting via a bypass line the two terminals of one of the capacitor units upon an electrical insulation failure of the capacitor unit;
   oscillation preventing resistors each coupled in series with a capacitor unit to form a serial circuit together with a bypass line of the short-circuiting means upon an insulation failure of the capacitor unit, thereby preventing an oscillation of a short-circuit current flowing in said serial circuit; and
   energy absorbing resistors each coupled in series with one of said capacitor units such that each one of the capacitor units is coupled in series with at least one of the energy absorbing resistors, whereby when the short-circuiting means is triggered to short-circuit a failing one of the capacitor units via a bypass line, electrical energy stored in other capacitor units and discharged via the bypass line and the failing capacitor unit is substantially absorbed and dissipated by the energy absorbing resistors.

6. A capacitor bank as claimed in claim 5, wherein the short-circuiting means comprises at least one bypass line via which a pair of parallel connected capacitor units are short-circuited upon failure of one of the pair of the capacitor units, an energy absorbing resistor being coupled in series with the pair of parallel connected capacitor units.

7. A capacitor bank as claimed in claim 5, wherein said oscillation preventing resistors are selected to have a value which satisfies the following equation:

$$R_y \geq 2\sqrt{\frac{L}{C}}$$

Where $R_y$ = Oscillation preventing resistor's resistance,
L = The stray inductance of the circuit consisting of a single short-circuiting device and a single capacitor unit,
C = The capacitance of a single capacitor unit.

8. A capacitor bank adapted for supplying a large current instantaneously to a load upon closure of a circuit-closure switch comprising:

a plurality of capacitor units coupled in parallel each capacitor unit having two terminals;

short-circuiting means for short-circuiting via a bypass line the two terminals of any one of the capacitor units upon an electrical insulation failure of the respective capacitor unit;

oscillation preventing resistors each coupled in series with a capacitor unit to form a serial circuit together with a bypass line of the short-circuiting means upon an insulation failure of the capacitor unit, thereby preventing an oscillation of a short-circuit current flowing in said serial circuit;

energy absorbing resistors each coupled in series with a plurality of said capacitor units and said oscillation preventing resistors forming a capacitor bank unit; and a plurality of the capacitor bank units connected in parallel, whereby when any one of the capacitor bank units undergoes an electrical insulation failure, electrical energy flowing into the failing capacitor bank unit from other capacitor bank units is substantially absorbed and dissipated by the energy absorbing resistors.

9. A capacitor bank adapted for supplying a large current instantaneously to a load upon closure of a circuit-closure switch comprising:

a plurality of capacitor units coupled in parallel;

energy absorbing resistors each coupled in series with one of said capacitor units such that each one of the capacitor units is coupled in series with at least one of the energy absorbing resistors, whereby when any one of the capacitor units undergoes an electrical insulation failure, electrical energy flowing into the failing capacitor unit from other capacitor units is substantially absorbed and dissipated by the energy absorbing resistors;

a plurality of rows of capacitor units coupled in parallel, an energy absorbing resistor being coupled in series with each one of the capacitor units, wherein the rows of capacitor units are coupled in series to form a capacitor bank;

a second current maintenance capacitor bank comprising a single row of parallel connected capacitor units, a diode, and a resistor; said resistor being connected in series with said diode; said resistor and said diode being connected in parallel with said capacitor units forming said current maintenance capacitor bank; and a second diode for controlling the direction of the current through the bank, said second diode and said current maintenance capacitor bank being connected in series;

said diode and said current maintenance capacitor bank being connected in parallel with said first capacitor bank.

* * * * *

UNITED STATES PATENT AND TRADEMARK OFFICE
CERTIFICATE OF CORRECTION

PATENT NO. : 5,087,999

DATED : February 11, 1992

INVENTOR(S) : Sato et al.

It is certified that error appears in the above-identified patent and that said Letters Patent is hereby corrected as shown below:

Claim 5, column 10, line 43, after "of" insert --any--.

Signed and Sealed this

First Day of June, 1993

Attest:

MICHAEL K. KIRK

*Attesting Officer*   *Acting Commissioner of Patents and Trademarks*